(12) United States Patent
Leonard et al.

(10) Patent No.: US 11,582,977 B1
(45) Date of Patent: Feb. 21, 2023

(54) PERITONEUM REMOVAL ASSEMBLY

(71) Applicants: James Leonard, Baldwin City, KS (US); Arthur Martinez, Baldwin City, KS (US)

(72) Inventors: James Leonard, Baldwin City, KS (US); Arthur Martinez, Baldwin City, KS (US)

( * ) Notice: Subject to any disclaimer, the term of this patent is extended or adjusted under 35 U.S.C. 154(b) by 0 days.

(21) Appl. No.: 17/400,738

(22) Filed: Aug. 12, 2021

(51) Int. Cl.
*A22C 17/00* (2006.01)

(52) U.S. Cl.
CPC .................................. *A22C 17/00* (2013.01)

(58) Field of Classification Search
CPC .......................... A22C 17/002; A22C 17/0033
USPC ............................. 452/117; 30/495, 500, 278
See application file for complete search history.

(56) References Cited

U.S. PATENT DOCUMENTS

| | | | |
|---|---|---|---|
| 2,618,810 A * | 11/1952 | Fishburne | A22C 25/006 452/132 |
| 3,333,295 A | 8/1967 | Spets | |
| 5,703,315 A * | 12/1997 | Coggan | B64D 1/02 114/221 A |
| 6,179,534 B1 | 1/2001 | Weckter | |
| 6,705,597 B1 * | 3/2004 | Reilly | B60P 7/0846 254/223 |
| 7,100,714 B1 * | 9/2006 | Sollami | E21B 10/58 175/420.1 |
| D594,305 S * | 6/2009 | Gyder | D8/70 |
| D633,782 S * | 3/2011 | Tompkins | D8/382 |
| 8,413,548 B2 * | 4/2013 | Redmond | B25B 13/28 408/80 |
| D739,624 S * | 9/2015 | Rebar | D32/35 |
| 2009/0133548 A1 * | 5/2009 | Ogston | B26B 7/00 83/13 |
| 2012/0145820 A1 | 6/2012 | White | |
| 2014/0110520 A1 * | 4/2014 | Hampson | B60P 7/0846 242/395 |

FOREIGN PATENT DOCUMENTS

| | | |
|---|---|---|
| GB | 2100577 | 1/1983 |
| WO | WO2014138777 | 9/2014 |

* cited by examiner

*Primary Examiner* — Richard T Price, Jr.

(57) ABSTRACT

A peritoneum removal assembly for removing the peritoneum from a cut of raw meat includes a rod that has a pair of polygonal sections that can be engaged by a chuck on a power drill thereby facilitating the rod to be rotated about a lengthwise axis of the rod. A slot is integrated into the rod such that a peritoneum on a cut of raw meat can be extended through the slot. The slot extends toward the polygonal section such that the slot rotates about the lengthwise axis of the rod. In this way the slot facilitates the peritoneum to wrap around the rod when the power drill is turned on for removing the peritoneum from the cut of raw meat.

2 Claims, 4 Drawing Sheets

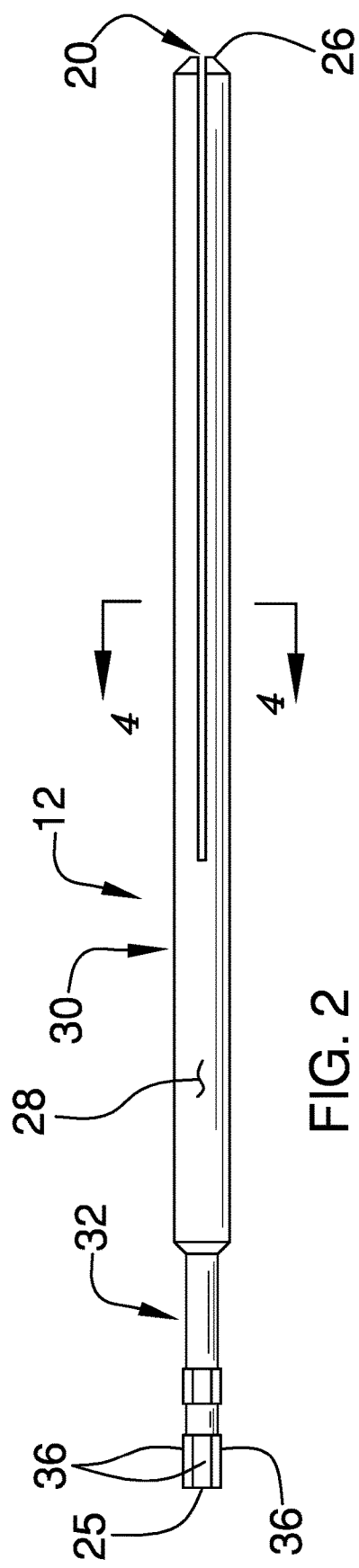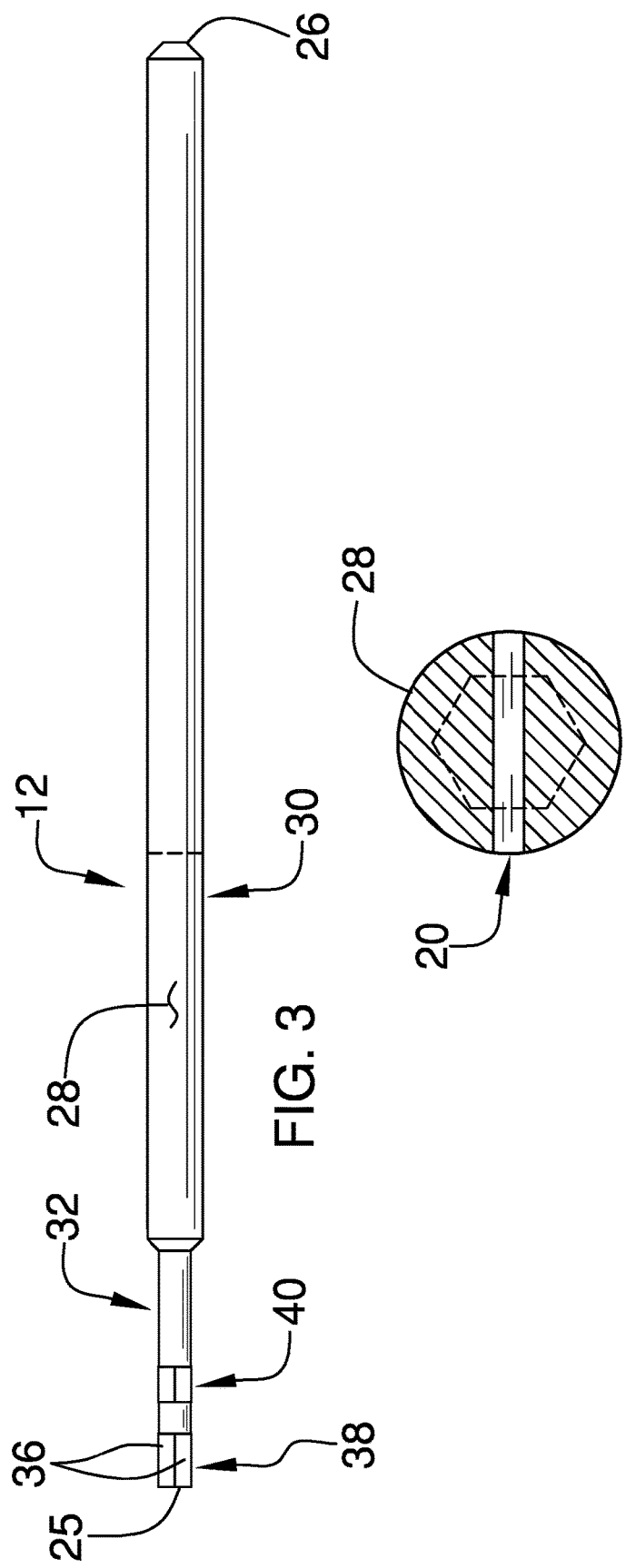

PERITONEUM REMOVAL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to peritoneum removal device and more particularly pertains to a new peritoneum removal device for removing the peritoneum from a cut of raw meat. The device includes a rod which has a slot that extends longitudinally along the rod. The rod can be inserted into the chuck of a power drill for spinning the rod. The peritoneum on the cut of raw meat can be extended through the slot such that the peritoneum is wrapped around the rod when the power drill is turned on. In this way the peritoneum can be quickly and efficiently removed from the cut of raw meat.

(2) Description of Related Art Including Information Disclosed Under 37 CFR 1.97 and 1.98

The prior art relates to peritoneum removal devices including a fish skinning tool that includes a blade which has a slot being longitudinally integrated into the blade. The prior art discloses a strap roller that includes a crank which has a slot integrated into a rod portion of the crank for rolling a strap. The prior art discloses an electronic strap winder that includes a rod that is attached to an electric motor and which has a slot integrated into the rod for rolling a cargo strap.

BRIEF SUMMARY OF THE INVENTION

An embodiment of the disclosure meets the needs presented above by generally comprising a rod that has a pair of polygonal sections that can be engaged by a chuck on a power drill thereby facilitating the rod to be rotated about a lengthwise axis of the rod. A slot is integrated into the rod such that a peritoneum on a cut of raw meat can be extended through the slot. The slot extends toward the polygonal section such that the slot rotates about the lengthwise axis of the rod. In this way the slot facilitates the peritoneum to wrap around the rod when the power drill is turned on for removing the peritoneum from the cut of raw meat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a right side view of an embodiment of the disclosure.

FIG. 3 is a top view of an embodiment of the disclosure.

FIG. 4 is a cross sectional view taken along line 4-4 of FIG. 2 of an embodiment of the disclosure.

DETAILED DESCRIPTION OF THE INVENTION

Figure 1:
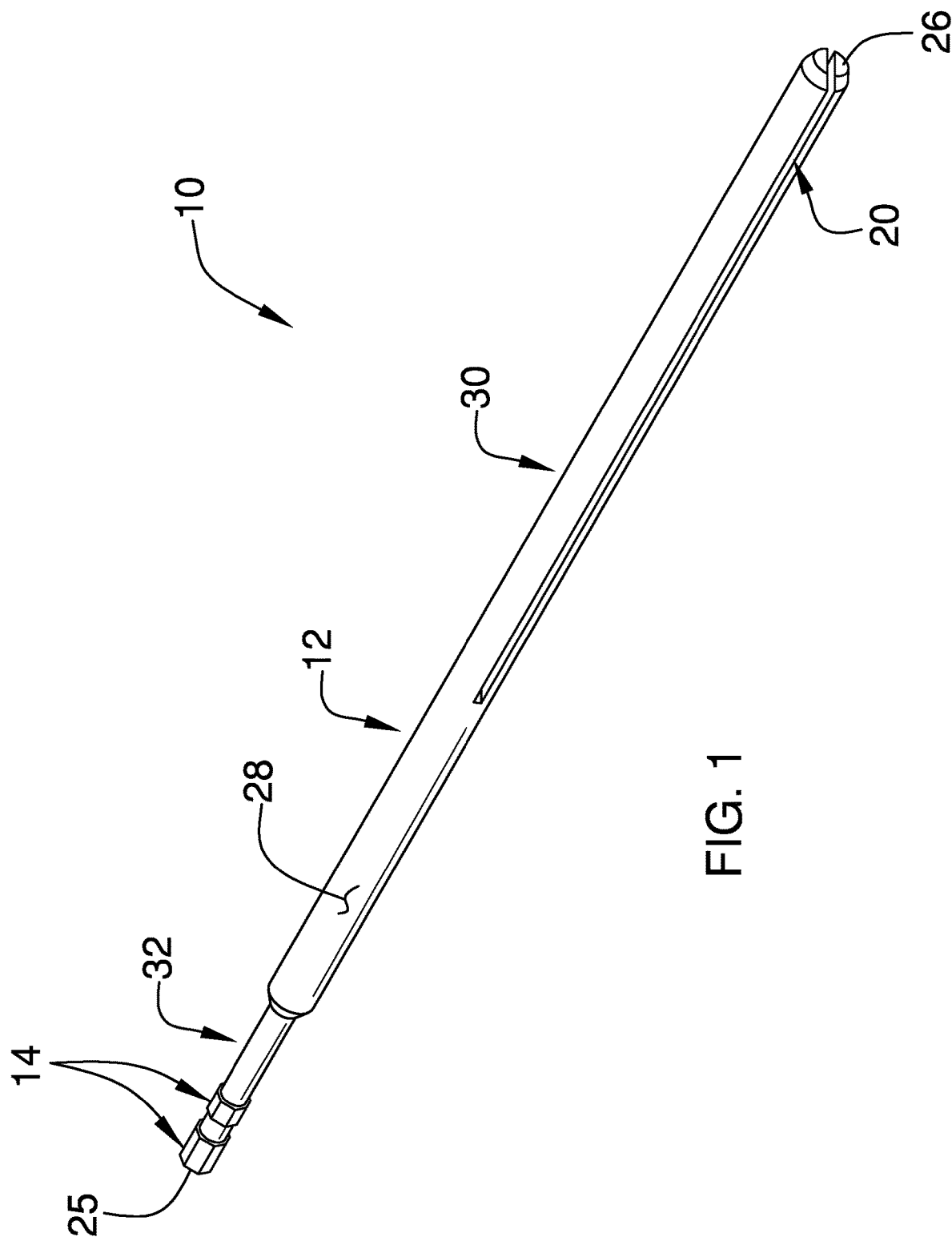
FIG. 1 is a perspective view of a peritoneum removal assembly according to an embodiment of the disclosure.
Figure 5:
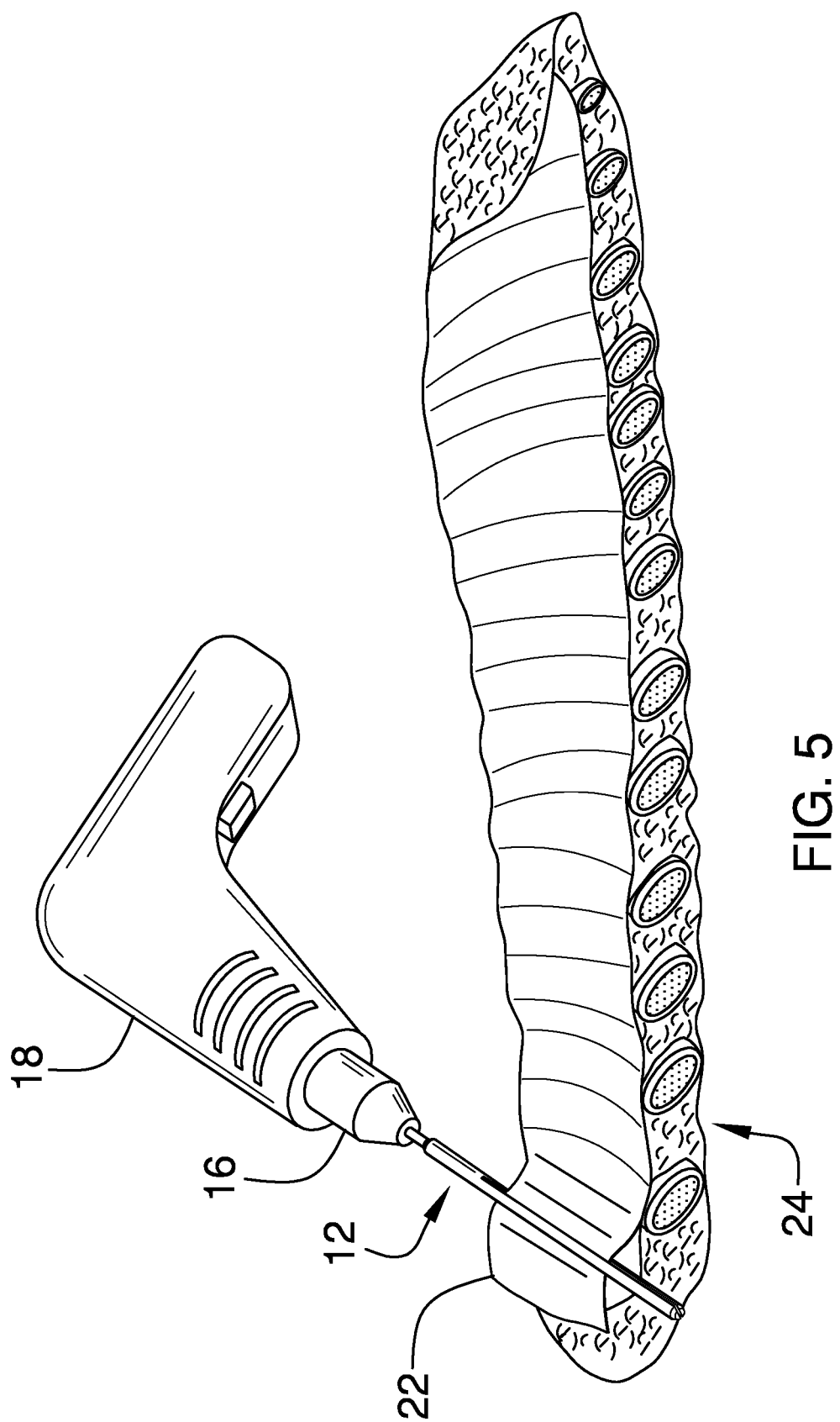
FIG. 5 is a perspective in-use view of an embodiment of the disclosure showing a peritoneum being extended through a slot in a rod.
Figure 6:
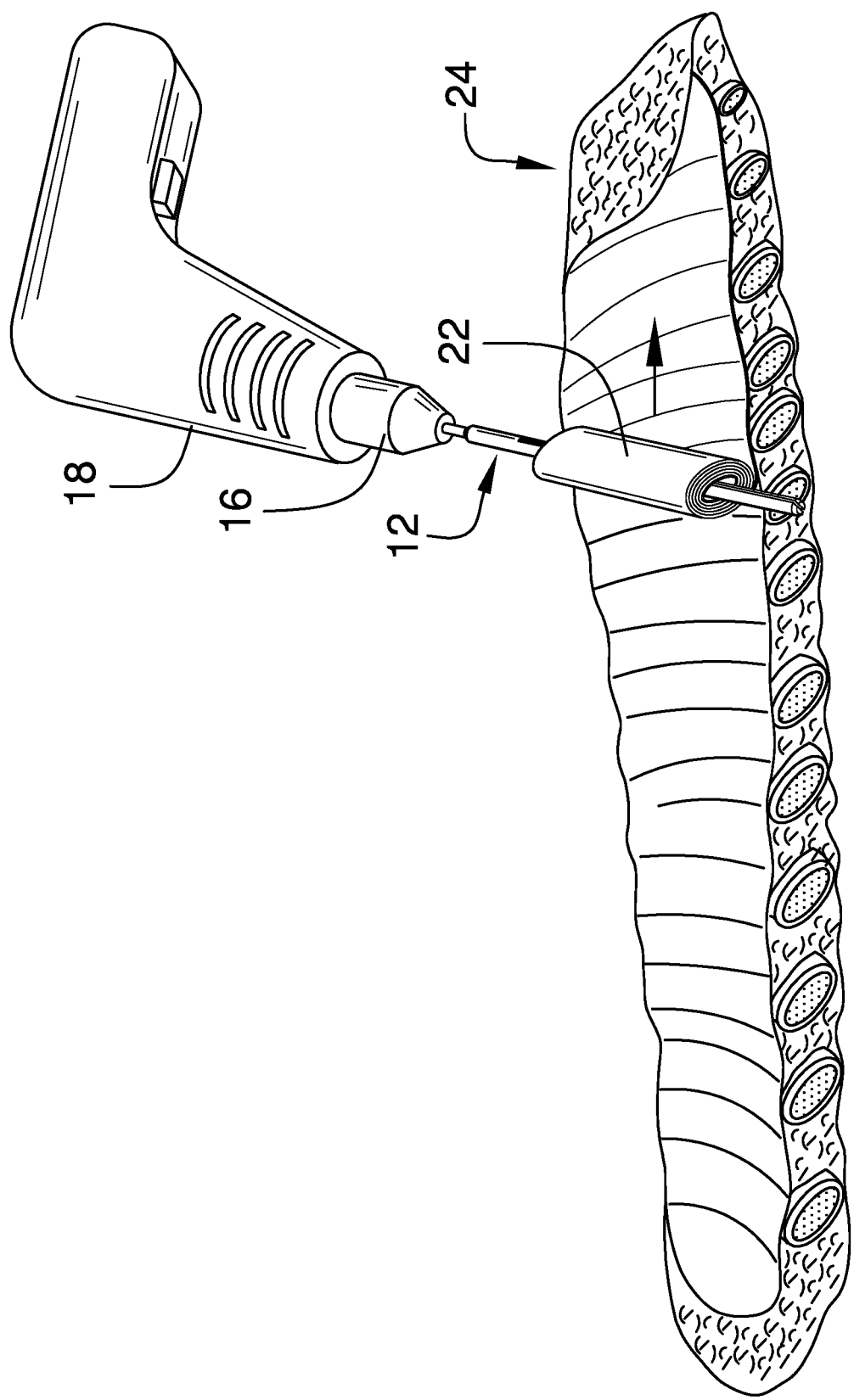
FIG. 6 is a perspective in-use view of an embodiment of the disclosure showing a peritoneum being wrapped around a rod to remove the peritoneum from a cut of raw meat.

With reference now to the drawings, and in particular to FIGS. 1 through 6 thereof, a new peritoneum removal device embodying the principles and concepts of an embodiment of the disclosure and generally designated by the reference numeral 10 will be described.

As best illustrated in FIGS. 1 through 6, the peritoneum removal assembly 10 generally comprises a rod 12 that has a pair of polygonal sections 14 that can each be engaged by a chuck 16 on a power drill 18 thereby facilitating the rod 12 to be rotated about a lengthwise axis of the rod 12. The power drill 18 may be a cordless drill, a corded drill or any other type of power drill. A slot 20 is integrated into the rod 12 and a peritoneum 22 on a cut of raw meat 24 can be extended through the slot 20. The cut of raw meat 24 may be a rack of ribs or other cut of meat that has a peritoneum that is commonly removed prior to cooking. The slot 20 extends toward the polygonal sections 14 such that the slot 20 rotates about the lengthwise axis of the rod 12. In this way the slot 20 facilitates the peritoneum 22 to wrap around the rod 12 when the power drill 18 is turned on for removing the peritoneum 22 from the cut of raw meat 24.

The rod 12 has a first end 25, a second end 26 and an outer surface 28 extending between the first end 25 and the second end 26, and the rod 12 is elongated between the first end 25 and the second end 26. The rod 12 may have a length of at least 12.0 inches and the slot 20 may have a length of at least 8.0 inches. The outer surface 28 has a first portion 30 that has a diameter which is greater than the diameter of a second portion 32. A threshold 34 between the first portion 30 and the second portion 32 is positioned closer to the first end 25 than the second end 26.

The outer surface 28 corresponding to the first portion 30 has a plurality of intersecting sides 36 at a point that is located adjacent to the first end 25 of the rod 12. In this way the plurality of intersecting sides 36 defines a respective one of the polygonal sections 14 of the rod 12. A first one of the polygonal sections 38 is aligned with the first end 25 and a second one of the polygonal sections 40 is spaced from the first polygonal section 38. The slot 20 extends through the second end 26 toward the first end 25, and the slot 20 extends outwardly through the outer surface 28 on opposite sides 36 of the outer surface 28. Furthermore, the slot 20 extends a substantial distance between the second end 26 and the threshold 34 between the first portion 30 and the second portion 32 of the outer surface 28 of the rod 12. The slot 20 is oriented to extend along a centerline extending between the first end 25 and the second end 26 of the rod 12.

In use, the first end 25 of the rod 12 is inserted into the chuck 16 of the power drill 18 and the chuck 16 is tightened against the polygonal sections 14 of the rod 12. The rod 12 is oriented to extend along a line that is oriented perpendicular to a length of the peritoneum 22 and the peritoneum 22 is extended through the slot 20. In this way the peritoneum 22 is wrapped around the rod 12 when the power drill 18 is turned on to rapidly remove the peritoneum 22. Thus, a caterer, for example, can quickly and efficiently remove the peritoneum 22 from a large number of racks of ribs, for example, or other cut of raw meat prior to cooking the cut of raw meat.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A peritoneum removal assembly for removing a peritoneum from raw meat in preparation of cooking the raw meat, said assembly comprising:
 a rod having a pair of polygonal sections wherein each of said polygonal sections is configured to be engaged by a chuck on a power drill thereby facilitating said rod to be rotated about a lengthwise axis of said rod, said rod having a slot being integrated into said rod wherein said slot is configured to have a peritoneum on a cut of raw meat to be extended through said slot, said slot extending toward said polygonal section such that said slot rotates about said lengthwise axis of said rod wherein said slot is configured to facilitate the peritoneum to wrap around said rod when the power drill is turned on for removing the peritoneum from the cut of raw meat, said rod having a first end, a second end and an outer surface extending between said first end and said second end, said rod being elongated between said first end and said second end, said outer surface having a first portion having a diameter being greater than the diameter of a second portion, a threshold between said first portion and said second portion being positioned closer to said first end than said second end, said outer surface corresponding to said first portion having a plurality of intersecting sides at a point being located adjacent to said first end of said rod such that said plurality of intersecting sides defines a respective one of said polygonal sections of said rod, a first one of said polygonal sections being aligned with said first end, a second one of said polygonal sections being spaced from said first polygonal section, said slot extending through said second end toward said first end, said slot extending outwardly through said outer surface on opposite sides of said outer surface, said slot extending a substantial distance between said second end and said threshold between said first portion and said second portion of said outer surface of said rod, said slot being oriented to extend along a centerline extending between said first end and said second end of said rod.

2. A peritoneum removal system for removing a peritoneum from raw meat in preparation of cooking the raw meat, said system comprising:
 a power drill having a chuck;
 a rod having a pair of polygonal sections, said rod being insertable into said chuck such said chuck engages each of said polygonal sections thereby facilitating said rod to be rotated about a lengthwise axis of said rod, said rod having a slot being integrated into said rod wherein said slot is configured to have a peritoneum on a cut of raw meat to be extended through said slot, said slot extending toward said polygonal section such that said slot rotates about said lengthwise axis of said rod wherein said slot is configured to facilitate the peritoneum to wrap around said rod when said power drill is turned on for removing the peritoneum from the cut of raw meat, said rod having a first end, a second end and an outer surface extending between said first end and said second end, said rod being elongated between said first end and said second end, said outer surface having a first portion having a diameter being greater than the diameter of a second portion, a threshold between said first portion and said second portion being positioned closer to said first end than said second end, said outer surface corresponding to said first portion having a plurality of intersecting sides at a point being located adjacent to said first end of said rod such that said plurality of intersecting sides defines a respective one of said polygonal sections of said rod, a first one of said polygonal sections being aligned with said first end, a second one of said polygonal sections being spaced from said first polygonal section, said slot extending through said second end toward said first end, said slot extending outwardly through said outer surface on opposite sides of said outer surface, said slot extending a substantial distance between said second end and said threshold between said first portion and said second portion of said outer surface of said rod.

\* \* \* \* \*